United States Patent
Travish et al.

(10) Patent No.: US 12,131,411 B2
(45) Date of Patent: Oct. 29, 2024

(54) APPARATUS AND METHOD OF PRODUCING A TOMOGRAM

(71) Applicant: Adaptix Ltd., Begbroke (GB)

(72) Inventors: Gil Travish, Begbroke (GB); Steve Wells, Begbroke (GB); Martin Holden, Begbroke (GB); Ian Mitchell, Witney (GB)

(73) Assignee: ADAPTIX LTD, Begbroke (GB)

( * ) Notice: Subject to any disclaimer, the term of this patent is extended or adjusted under 35 U.S.C. 154(b) by 106 days.

(21) Appl. No.: 17/860,437

(22) Filed: Jul. 8, 2022

(65) Prior Publication Data

US 2022/0343568 A1  Oct. 27, 2022

Related U.S. Application Data

(63) Continuation of application No. PCT/GB2020/053170, filed on Dec. 10, 2020.

(30) Foreign Application Priority Data

Jan. 8, 2020  (GB) ...................... 2000238

(51) Int. Cl.
 *G06T 5/00* (2024.01)
 *G01N 23/046* (2018.01)
 (Continued)

(52) U.S. Cl.
 CPC .......... *G06T 11/008* (2013.01); *G01N 23/046* (2013.01); *G06T 7/0002* (2013.01);
 (Continued)

(58) Field of Classification Search
 CPC . G06T 11/00; G06T 1/00; G06T 1/007; G06T 3/14; G06T 5/00; G06T 5/10;
 (Continued)

(56) References Cited

U.S. PATENT DOCUMENTS 5,355,309 A  10/1994  Eberhard et al.
6,768,782 B1  7/2004  Hsieh et al.
(Continued)

FOREIGN PATENT DOCUMENTS

EP  1638051  3/2008
JP  2005-161044  6/2005
(Continued)

OTHER PUBLICATIONS

UKIPO, Search Report in corresponding GB application GB2000238.2, Jun. 22, 2020.
(Continued)

*Primary Examiner* — Don K Wong
(74) *Attorney, Agent, or Firm* — Alley IP

(57) ABSTRACT

The present invention seeks to reduce the burden of producing high-resolution tomograms by using an initial scan on a predetermined grid 10 to obtain a minimal set of images, and then regions of interest 20 are identified for further scanning. The further scanning locations 40 are determined by image entropy or gradient found in the previous iteration; such regions are indicative of edges, cracks or complex structure within the region. After each iteration, the level of information (e.g. image entropy or gradient) will decrease relative to the pixel/voxel size. In this way, a more efficient way to scan is achieved.

7 Claims, 3 Drawing Sheets

(51) Int. Cl.
*G06T 7/00* (2017.01)
*G06T 11/00* (2006.01)

(52) U.S. Cl.
CPC ...... *G06T 11/006* (2013.01); *G01N 2223/401* (2013.01); *G06T 2207/10072* (2013.01); *G06T 2211/424* (2013.01)

(58) Field of Classification Search
CPC .... G06T 5/20; G06T 5/40; G06T 5/50; G06T 2207/30; G06T 2211/40; G06T 2210/41; G06T 2207/10072; G06T 2207/10081; G06T 11/008; G06T 11/006; A61B 6/032; A61B 6/486; A61B 6/5211; A61B 6/5258; A61B 6/5288; A61B 6/5294
See application file for complete search history.

(56) References Cited

U.S. PATENT DOCUMENTS

| | | |
|---|---|---|
| 7,310,435 B2 | 12/2007 | Mallya et al. |
| 10,692,219 B2 | 6/2020 | Hauser et al. |
| 10,709,408 B2 | 7/2020 | Saito |
| 10,921,966 B2 | 2/2021 | Nakanishi |
| 10,964,073 B2 | 3/2021 | Herold et al. |
| 11,315,221 B2 * | 4/2022 | Matsuura ............. G06T 11/008 |
| 2008/0118021 A1 | 5/2008 | Dutta et al. |
| 2019/0076101 A1 | 3/2019 | Pan et al. |

FOREIGN PATENT DOCUMENTS

| | | |
|---|---|---|
| JP | 2015-006328 | 1/2015 |
| JP | 2018-525605 | 9/2018 |
| JP | 2019-051315 | 4/2019 |
| JP | 2019-139505 | 8/2019 |
| JP | 2019-524231 | 9/2019 |
| WO | 2013148632 | 10/2013 |
| WO | 2017133847 | 8/2017 |

OTHER PUBLICATIONS

WIPO, International Search Report and Written Opinion in corresponding PCT application PCT/GB2020/053170, Mar. 15, 2021.
JPO, Office Action in Corresponding JP Application 2022-541223, Jul. 23, 2024.

* cited by examiner

APPARATUS AND METHOD OF PRODUCING A TOMOGRAM

RELATED APPLICATIONS

This application claims the benefit under 35 U.S.C. § 120, and is a continuation, of co-pending International Application PCT/GB2020/053170, filed Dec. 10, 2020 and designating the US, which claims priority to GB Application 2000238.2, filed Jan. 8, 2020, such GB Application also being claimed priority to under 35 U.S.C. § 119. These GB and International applications are incorporated by reference herein in their entireties.

FIELD

The present invention relates generally to an apparatus and method for producing a tomogram and finds particular, although not exclusive, utility in pathology and/or non-destructive evaluation.

BACKGROUND

It is often required to perform high-resolution scans of relatively large regions; however, as resolutions increase and the size of regions increase, this becomes onerous. After reconstruction has been performed, it can become apparent that high resolution scans are not required over the full region, but that lower resolutions could have been used in certain sub-regions, which would have reduced some of the burden in both imaging and reconstruction.

SUMMARY

It is often required to perform high-resolution scans of relatively large regions; however, as resolutions increase and the size of regions increase, this becomes onerous. After reconstruction has been performed, it can become apparent that high resolution scans are not required over the full region, but that lower resolutions could have been used in certain sub-regions, which would have reduced some of the burden in both imaging and reconstruction.

The present invention seeks to reduce this burden by dynamically determining where high- and low-resolution scans are appropriate, during the imaging process. In this way, large structures such as aircraft wings may be scanned quickly and easily. In particular, a large region may be scanned at low resolution, while the system automatically determines sub-regions in which a higher resolution is required, based on the low-resolution scan.

According to a first aspect of the present invention, there is provided a method of producing a tomogram, the method comprising the steps of: acquiring a plurality of first x-ray attenuation images of a subject, the plurality of first x-ray attenuation images suitable for reconstructing a first density function indicative of attenuation of the x-ray radiation, the first density function having a first resolution; identifying, from the plurality of first x-ray attenuation images, at least one first region in which entropy and/or gradient exceeds a predefined threshold entropy and/or gradient, respectively; acquiring at least one second x-ray attenuation image of the at least one first region; and reconstructing a second density function indicative of attenuation of the x-ray radiation from the plurality of first x-ray attenuation images and the at least one second x-ray attenuation image, the second density function having a second resolution higher than the first resolution.

The approach uses an initial scan on a predetermined grid to obtain a minimal set of images, and then regions of interest are identified for further scanning. The further scanning locations are determined by the level of information (e.g. image entropy or gradient) found in the previous iteration; such regions are indicative of edges, cracks or complex structure within the region. After each iteration, the level of information (e.g. image entropy or gradient) will decrease relative to the pixel/voxel size. In this document, a voxel is defined as a 3D-pixel; that is, the size that determines the resolution of the reconstructed density function.

In this way, a more efficient way to scan is achieved. This means that the number of scan points (i.e. images) may be increased, which means lower power devices with shorter stand-off distances may be used, and this results in a more compact and portable unit. For example, common sources generate a cone of x-rays with an opening angle of 30-60 degrees. Moving such a source to a stand-off distance several times the object thickness would allow complete coverage for a 2D image, but at the cost of requiring several times the x-ray power due to the inverse-square law, and would require a very large detector area or multiple exposures from one location. The overall device volume and weight would grow compared to moving the source to small multiple of the object thickness.

The predefined threshold may be adjustable by an operator, or may be automatically selected by a processor on the basis of one or more physical constraints. Within a range of possible predefined thresholds, a low threshold may be chosen that is still above what is typically measured for homogeneous materials, and may account for background noise levels typical for a setting in which the imaging is to be performed (i.e. a low threshold may be chosen to look for subtle imperfections in an otherwise homogeneous material). Conversely, a high threshold may be chosen such that a fracture or sharp edge would reach such a setting (i.e. a high threshold may be chosen in order to merely identify fractures). The low threshold may be used to determine regions that need further examination while the high threshold may be used to determine when a region has reached sufficient detail that a small feature can be detected. Intermediate thresholds may be chosen by a user depending on the circumstances of the acquisition and/or the subject.

The method may further comprise the steps of: identifying, from the plurality of first x-ray attenuation images and the at least one second x-ray attenuation image, at least one second region in which entropy and/or gradient exceeds a predefined threshold entropy and/or gradient, respectively; acquiring at least one third x-ray attenuation image of the at least one second region; and reconstructing a third density function indicative of attenuation of the x-ray radiation from the plurality of x-ray attenuation images, the at least one second x-ray attenuation image and the at least one third x-ray attenuation image, the third density function having a third resolution higher than the second resolution.

Additional sequences involving identifying at least one further (e.g. third, fourth, etc.) region, acquiring at least one further (e.g. fourth, fifth, etc.) x-ray attenuation image, and reconstructing a further density function (e.g. fourth, fifth, etc.) are also contemplated, applied in a similar manner. The approach disclosed here is iteratively based on the image data obtained, and hence on the object features.

This iterative process may continue until at least one further region in which entropy and/or gradient exceeds a predefined threshold entropy and/or gradient, respectively, cannot be identified. Alternatively or additionally, this iterative process may continue until no further improvement in level of information (e.g. image entropy or gradient) is seen; that is, there is no further, decrease, or at least the decrease is below some threshold level, relative to the pixel/voxel size. The threshold level may be a percentage and/or absolute change relative to the predefined threshold entropy and/or gradient.

These limits define the end of the iterative process, and may be required to apply to all voxels.

Acquiring the plurality of first x-ray attenuation images of a subject may comprise determining a minimum number of first x-ray attenuation images required to reconstruct a first density function indicative of attenuation of the x-ray radiation. That is, this acquiring step may comprise determining a first set of emitter locations required in order to entirely irradiate the subject with x-ray cones originating from each emitter location. Entirely irradiate may mean at least a single beam of x-ray radiation passing through each part of the subject, and/or at least two, three or more beams of x-ray radiation passing through each part of the subject.

Reconstructing a first density function indicative of attenuation of the x-ray radiation may comprise generating a 2D image of the subject, or may comprise generating a 3D tomogram. The 3D tomogram thus produced may comprise a predetermined resolution, such as 10 microns, 20 microns, 50 microns, 100 microns, 200 microns, 500 microns, 1000 microns, etc. Selection of such a resolution may be performed by an operator or may be automatically selected based upon the requirements of the resultant tomogram and/or the subject under consideration.

Similarly, the 3D tomogram thus produced may comprise a predetermined slice thickness, such as 10 microns, 20 microns, 50 microns, 100 microns, 200 microns, 500 microns, 1000 microns, etc. Selection of such a slice thickness may be performed by an operator or may be automatically selected based upon the requirements of the resultant tomogram and/or the subject under consideration. The slice thickness may be determined based on the resolution sought (e.g. the slice thickness/resolution may be chosen to match the resolution within a slice) or may be independent of the resolution sought. In this way, the term resolution may mean a planar resolution of a slice (e.g. in the X-Y plane, for example in one or both of the X and Y axes), may relate to the pixel size, and/or may mean the slice resolution (e.g. resolution in the Z direction, at right-angles to the planar resolution. In particular, the term resolution may relate to the voxel size.

Reconstructing a subsequent (e.g. second, third, fourth, fifth, etc.) density function may comprise generating a further 3D tomogram having a slice thickness the same or smaller than the 3D tomogram produced from a preceding (e.g. first, second, third, fourth, etc.) density function.

The subject may be a person, body part, sample, manufactured component, or any other item to be interrogated. The subject may be a part thereof; that is, the subject may be a region of interest within the above-mentioned items. The region of interest may be of any shape (e.g. cuboidal, cylindrical, or any other geometrical shape defined by a user), and may be only a portion of the total region over which x-rays may be emitted and/or detected.

There may be a single movable x-ray emitter; however, in preferred embodiments, there may be a plurality of x-ray emitters, for instance arranged in an array (e.g. forming a flat panel). The array may be a triangular/hexagonal grid, a square/rectangular grid, and/or any other desirable grid; however, it is conceivable that a single emitter may be moved to replicate the arrangement of such a grid. The plurality of x-ray emitters may or may not also be movable relative to the subject. The plurality of x-ray emitters may or may not also be movable relative to a detector (e.g. a detector panel).

The step of identifying, from the plurality of first x-ray attenuation images, at least one first region in which entropy and/or gradient exceeds a predefined threshold entropy and/or gradient, respectively, may comprise: reconstructing a first density function indicative of attenuation of the x-ray radiation; and for each point in a plurality of points in the first density function, determining an entropy and/or gradient within a region surrounding that point. This step of identifying may be performed automatically by a processor.

The points may be selected and/or predetermined to correspond to a grid/array that may be applied to each slice of the first density function. Alternatively or additionally, the points may correspond to pixels/voxels in the first density function.

For example, the step of identifying, from the plurality of first x-ray attenuation images, at least one first region in which entropy and/or gradient exceeds a predefined threshold entropy and/or gradient, respectively, may comprise: reconstructing a first density function indicative of attenuation of the x-ray radiation, the first density function comprising a plurality of pixels/voxels having values corresponding to the determined amount of x-ray attenuation; and/or for each pixel/voxel of the plurality of pixels/voxels in the first density function, determining an entropy and/or gradient within a region surrounding that pixel/voxel.

The region surrounding that point/pixel/voxel may be determined based on an absolute distance from that pixel/voxel and/or the center of that point/pixel/voxel (e.g. radius), and/or a relative distance from that point/pixel/voxel and/or the center of that point/pixel/voxel (e.g. radius). In this context, absolute distance may mean a distance measured relative to the subject (e.g. a distance in microns), and/or relative distance may mean a distance measured relative to the pixels/voxels (e.g. a number of pixels/voxels and/or slices, for example at least one, two, five, ten, twenty, fifty or more pixels/voxels slices).

Such calculations of entropy (e.g. by calculating total variation within the region) may involve using a weighting term based on the distance from the scan location under examination.

The plurality of pixels/voxels in the first density function may form all the pixels/voxels in the first density function, or may form only a subset of the total pixels/voxels in the first density function, such that the determining step is only performed on the subset. In this way, processing can be reduced.

The same principles discussed above with respect to the first density function may be applied to subsequent (e.g. second, third, fourth, etc.) density functions. For example, the second density function may comprise a second plurality of pixels/voxels having values corresponding to the determined amount of x-ray attenuation, and the step of identifying, from the plurality of first x-ray attenuation images and the at least one second x-ray attenuation image, at least one second region in which entropy and/or gradient exceeds a predefined threshold entropy and/or gradient, respectively, may comprise, for each pixel/voxel of the plurality of pixels/voxels in the second density function, determining an entropy and/or gradient within a region surrounding that pixel/voxel.

The step of identifying, from the plurality of first x-ray attenuation images, at least one first region in which entropy and/or gradient exceeds a predefined threshold entropy and/or gradient, respectively, may comprise: for each potential location of an x-ray source: back-projecting from a detector plane to the respective potential location through the at least one first region; and establishing, for each voxel within the at least one first region, whether to acquiring the at least one second x-ray attenuation image from that potential location; wherein the acquiring of the at least one second x-ray attenuation image of the at least one first region comprises acquiring attenuation images corresponding to those established potential locations.

The establishing step may comprise: optimising a function comprising weighted constraints including: a geometric factor that maximises angular coverage of the voxel; an overlap factor that ensures the voxel is imaged at least once; and an entropy factor that minimises entropy within the at least one first region; and selecting a potential location based on a value of the function.

The geometric factor may tend to drive the scan points to be as far apart as possible (i.e. is weighted to larger angles, but less than a maximal cone angle of the source). The overlap factor may tend to maximize the overlap, which may drive the scan points to be as close as possible. The overlap factor may be deemed a 'no blind spot' condition. The weighting may be determined by measurement or modelling, but will differ dependent on the hardware under consideration.

Subsequent scans may be performed in the direction of the highest entropy gradient or at the nearest grid point.

The method may further comprise the step of determining a near-optimal path between each one of the at least one second x-ray attenuation images to be acquired.

Once a complete set of source position "requests" have been generated, a near-optimal path may be computed. In general, the optimal path between n-points without repeat visits is not soluble in closed form, and NP-hard (thus requiring large computational costs for n>>>1). Techniques from the well-studied "Traveling Salesman Problem" (TSP) are typically employed to find a near optimal paths through a set of coordinates.

The source may be moved to each of the points along the optimal path, and an exposure may be taken at each point and recorded on the detector. This movement may be real; that is, the source may be physically moved between the points along the path. Alternatively or additionally, the movement may be virtual; that is, a sequence of x-ray emitters may be activated within an emitter array, tracing out the path. In some embodiments, a combination or real and virtual movement may be used; that is, an emitter array may be physically moved, allowing individual x-ray emitters to be activated to trace out the path. Multiple exposures may be required for a given location when the detector is small compared to the x-ray cone projection, in which case the detector must be moved to several positions with an exposure taken at each detector position. In such cases the detector area and position are treated as a sub-set of the total required detection area, and the detector is positioned repeatedly to cover the total required detection area.

For very-high-resolution tomograms, repeat scans at all the established positions plus or minus a predetermined offset (for example half the detector pixel size, although other offsets are envisaged) in one or more of the cardinal directions may be performed. A final reconstruction may be performed on the final composite data set.

It can be appreciated that it is not necessary to completely scan the subject prior to performing the subsequent steps, but rather the identifying step may be carried out immediately after first acquisition.

According to a second aspect of the present invention, there is provided an apparatus for producing a tomogram, the apparatus comprising: an x-ray emitter; an x-ray detector panel; and a processor for carrying out the method according to any preceding claim.

The apparatus may comprise an x-ray emitter panel composed of a plurality of x-ray emitters, of which the stated x-ray emitter is one such example. Alternatively, the stated x-ray emitter may be the only such x-ray emitter in the apparatus.

The x-ray emitter (and/or the x-ray emitter panel) may be movable. In particular, the x-ray emitter (and/or the x-ray emitter panel) may be mounted on an armature for movement, for example automatic movement by the processor.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
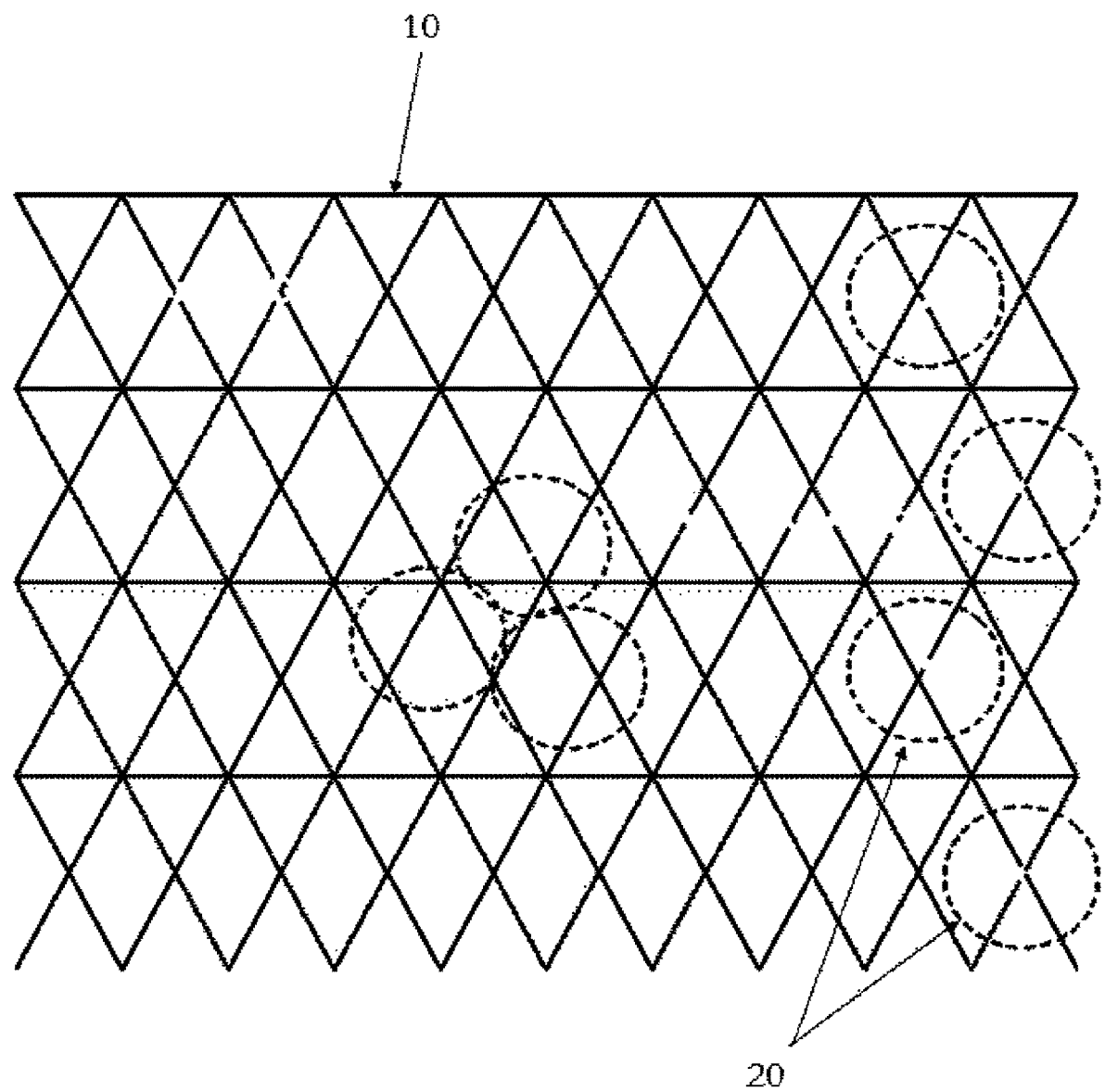
FIG. 1 shows an array of x-ray sources with overlapping regions of interest indicated.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 shows part of a triangular/hexagonal array in which x-ray sources are located at the intersections of the grid lines 10. Dashed circles 20 indicate where regions of interest have been identified where a higher resolution image is desirable.

Figure 2:
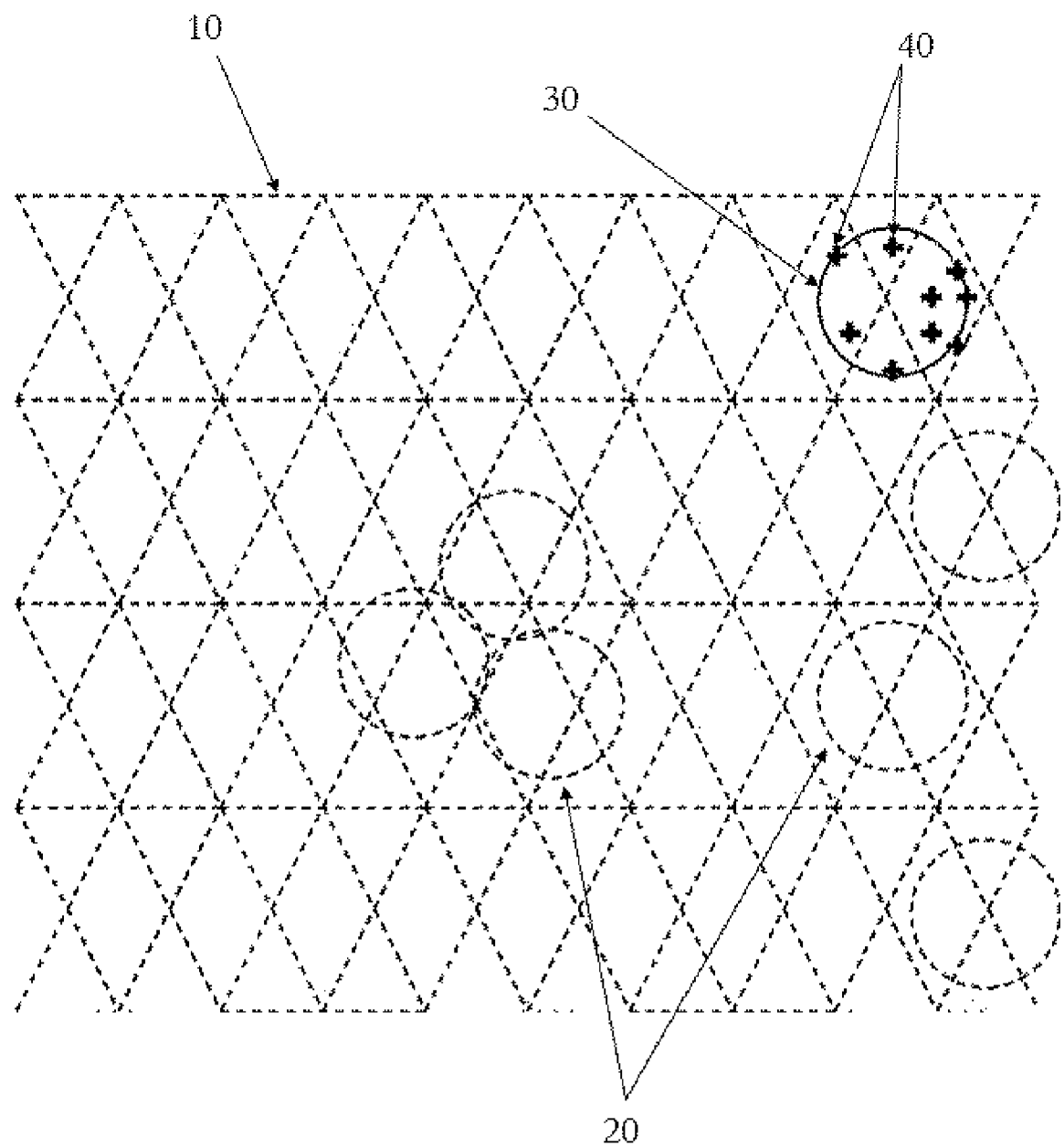
FIG. 2 shows the same view as FIG. 1, with indications of subsequent image capturing locations marked for a first one of the regions of interest.

FIG. 2 shows the same view as FIG. 1, this time with the grid lines 10 dashed out for clarity. Dashed circles 20 remain, indicating where the regions of interest have been identified. A first region of interest 30 is shown with a solid line. Within and adjacent to the first region of interest 30 are indicated subsequent image capturing locations 40, marked by respective crosses.

Each of the identified image capturing locations 40 has been selected in order to establish a high-resolution reconstruction of the region of interest. The image capturing locations 40 are not distributed uniformly over the region of interest because their location has been established based on optimizing a weighted formula including terms corresponding to the entropy of the image around each voxel in the reconstruction, angular coverage of the voxel, and a degree of overlap of x-ray cones at the voxel.

Figure 3:
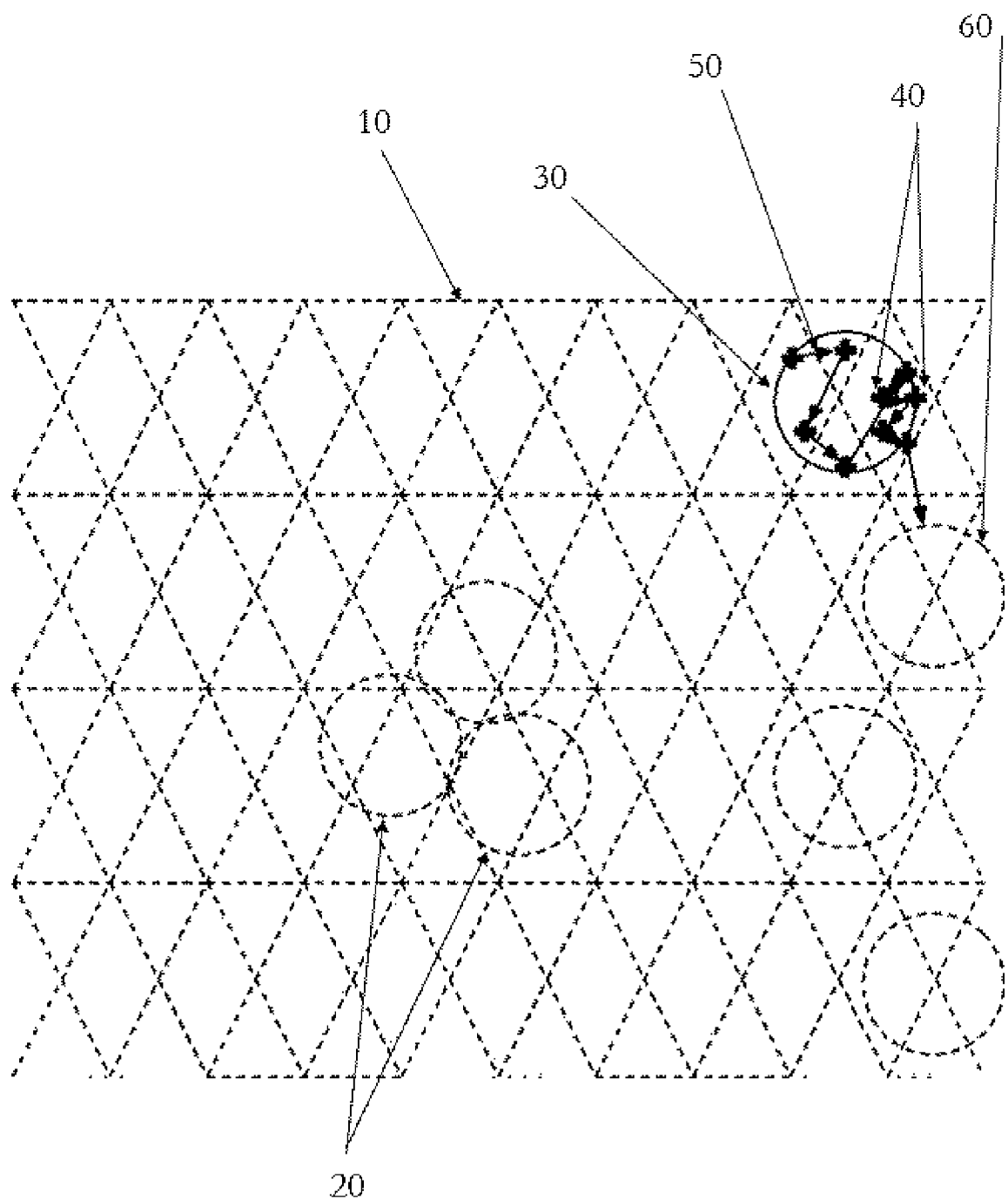
FIG. 3 shows the same view as FIG. 2, with a near-optimal path marked between the subsequent image capturing locations.

FIG. 3 shows the same view as FIG. 2, with a near-optimal path 50 marked between the subsequent image capturing locations.

In this example, the near optimal path passes through all image capturing locations 40 in the first region of interest before moving on to a second region of interest 60; however, in preferred embodiments the near-optimal path 50 will be determined on consideration of all image capturing locations across all the regions of interest 20. Therefore, the near-optimal path may move between regions of interest, and may return to a previous region of interest to collect further image capturing locations.

In the present example, the first region of interest 30 has been chosen as an illustrative example only, such that the near-optimal path 50 passes through all the image capturing locations 40 prior to moving to the second region of interest 60. However, it is to be appreciated that this would not be the case if a different region of interest 20 had been chosen for the illustrative example.

The invention claimed is:

1. A method of producing a tomogram, the method comprising the steps of:

acquiring a plurality of first x-ray attenuation images of a subject, the plurality of first x-ray attenuation images suitable for reconstructing a first density function indicative of attenuation of the x-ray radiation, the first density function having a first resolution;

identifying, from the plurality of first x-ray attenuation images, at least one first region in which entropy and/or gradient exceeds a predefined threshold entropy and/or gradient, respectively;

acquiring at least one second x-ray attenuation image of the at least one first region; and reconstructing a second density function indicative of attenuation of the x-ray radiation from the plurality of first x-ray attenuation images and the at least one second x-ray attenuation image, the second density function having a second resolution higher than the first resolution.

2. The method of producing a tomogram of claim 1, the method further comprising the steps of:
- identifying, from the plurality of first x-ray attenuation images and the at least one second x-ray attenuation image, at least one second region in which entropy and/or gradient exceeds a predefined threshold entropy and/or gradient, respectively;
- acquiring at least one third x-ray attenuation image of the at least one second region; and
- reconstructing a third density function indicative of attenuation of the x-ray radiation from the plurality of x-ray attenuation images, the at least one second x-ray attenuation image and the at least one third x-ray attenuation image, the third density function having a third resolution higher than the second resolution.

3. The method of producing a tomogram of claim 1, wherein the step of identifying, from the plurality of first x-ray attenuation images, at least one first region in which entropy and/or gradient exceeds a predefined threshold entropy and/or gradient, respectively, comprises:
- reconstructing a first density function indicative of attenuation of the x-ray radiation; and
- for each point in a plurality of points in the first density function, determining an entropy and/or gradient within a region surrounding that point.

4. The method of producing a tomogram of claim 1, wherein the step of identifying, from the plurality of first x-ray attenuation images, at least one first region in which entropy and/or gradient exceeds a predefined threshold entropy and/or gradient, respectively, comprises for each potential location of an x-ray source:
- back-projecting from a detector plane to the respective potential location through the at least one first region; and
- establishing, for each voxel within the at least one first region, whether to acquiring the at least one second x-ray attenuation image from that potential location;
- wherein the acquiring of the at least one second x-ray attenuation image of the at least one first region comprises acquiring attenuation images corresponding to those established potential locations.

5. The method of producing a tomogram of claim 4, wherein the establishing step comprises:
- optimising a function comprising weighted constraints including:
  - a geometric factor that maximises angular coverage of the voxel;
  - an overlap factor that ensures the voxel is imaged at least once; and
  - an entropy factor that minimises entropy within the at least one first region; and
- selecting a potential location based on a value of the function.

6. The method of producing a tomogram of claim 1, further comprising the step of determining a near-optimal path between each one of the at least one second x-ray attenuation images to be acquired.

7. An apparatus for producing a tomogram, the apparatus comprising:
- an x-ray emitter;
- an x-ray detector panel; and
- a processor for carrying out the method according to claim 1.

* * * * *